Aug. 7, 1945.  C. R. WASEIGE  2,381,018
FLY-WHEEL STARTER FOR AIRCRAFT ENGINES
Filed June 29, 1940  2 Sheets-Sheet 2

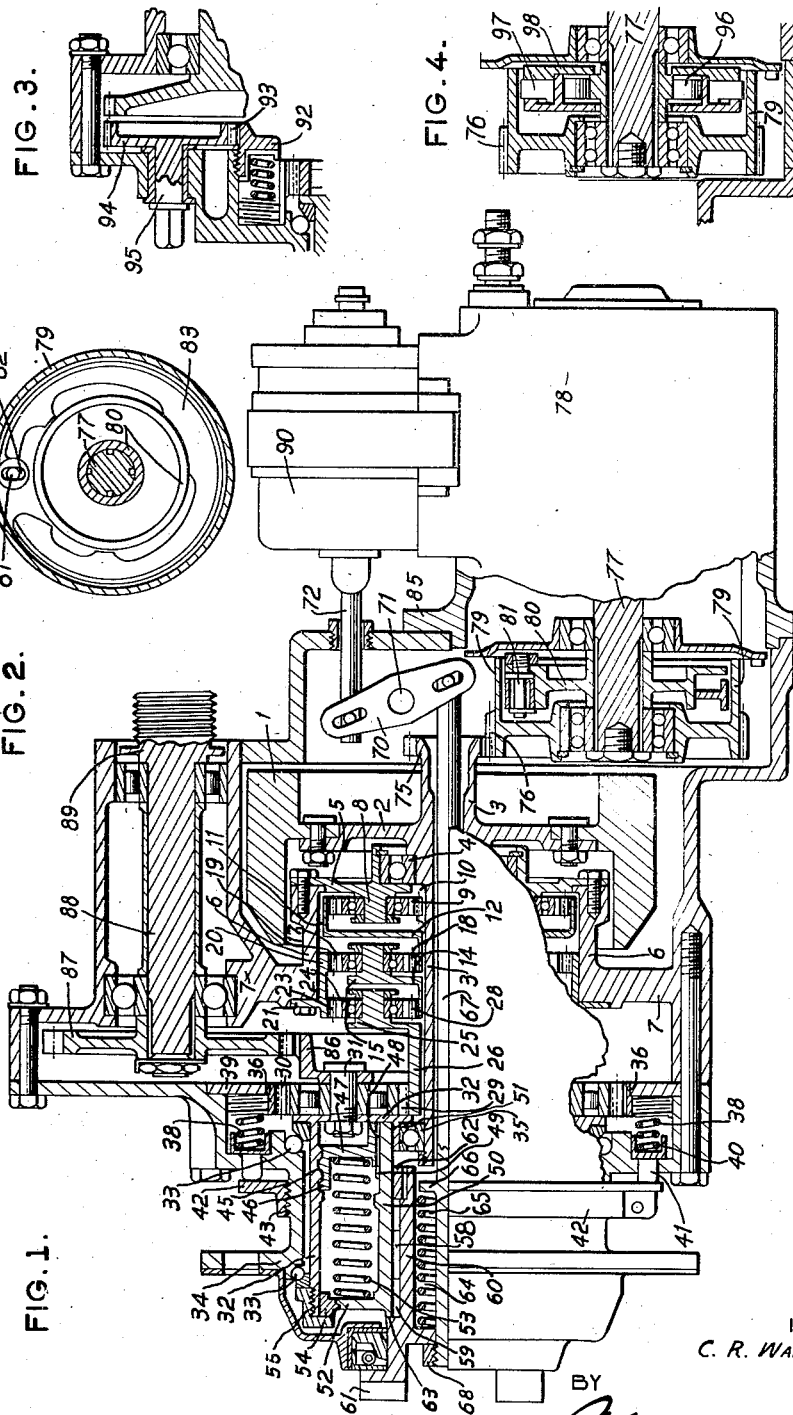

INVENTOR
C. R. WASEIGE
BY
ATTORNEY.

Patented Aug. 7, 1945

2,381,018

UNITED STATES PATENT OFFICE 2,381,018

FLYWHEEL STARTER FOR AIRCRAFT ENGINES

Charles Raymond Waseige, Rueil, Seine-et-Oise, France; vested in the Alien Property Custodian Application June 29, 1940, Serial No. 343,303
In France July 28, 1939

11 Claims. (Cl. 123—179)

My invention relates to the devices used for starting internal combustion engines for aircrafts and the like and more particularly to those mechanical devices intended to rotate the engine to be started which are known by the name of fly-wheel starters, and also to electric devices for producing the ignition during starting, and has for its objects a number of improvements in this type of devices, which improvements may be used together or separately.

It is known that such starters essentially comprise an electric or other motor which enables a high speed to be imparted to a fly-wheel which is connected by a mechanism including a high ratio reducing gear to a claw that a control enables to be coupled to the engine to be started when said fly-wheel has accumulated sufficient energy.

A first improvement in starters consists in that, in combination with a torque limiting device interposed in the transmission from the fly-wheel to the coupling claw for the engine to be started, there exists a resilient metal device which is adapted to be tensioned progressively by the action of a momentary difference in speed between two members of the said transmission which are connected to each other without reducing gearing by means which enable them to effect an angular displacement relatively to each other, the degree of tension of said resilient device determining the driving torque applied to the said coupling claw and said torque limiting device being in this case adapted only to slip in the event of there being an abnormally high resisting torque.

This combination of means has the advantage of preventing slipping of the torque limiting device when the starter is coupled to the engine to be started, slipping only occurring for a resisting torque which is much greater than the torque required to start the rotation of the engine crankshaft, that is to say in case of abnormal resistance or of back-firing in the engine; furthermore, the driving torque of the coupling claw increases very gradually from a small or zero value up to that required for rotating the crankshaft.

In a preferred embodiment, the transmission mechanism comprises two rotary members which are rotatable about the same axis while being stationary with respect to said axis in a direction parallel thereto and one of which is driven by the fly-wheel of the starter and the other is rotatable integral with the coupling claw for the engine, and the transmission between said two rotary members is ensured by a movable member which is slidable parallel to said shaft and is connected, for this purpose, to said two rotary members respectively by means of slidable keying means, at least one of which is formed by reversible ramps, helical or the like, said movable member being subjected to the action of a resilient device which urges it parallel to said axis in the opposite direction to the movement it effects under the action of said ramps when the aforesaid driven rotary member rotates slower than the driving rotary member.

Advantageously, the driving rotary member is formed by a barrel and the driven member by a coaxial sleeve on which the stem of the coupling claw is slidably keyed; the movable member being provided with splines adapted to cooperate with splines provided on the facing surfaces of the barrel and of the sleeve respectively and being subjected to the action of one or a series of springs lodged in the barrel.

It is advantageous for both the aforesaid splines to be formed by helical ramps so as to increase the angle of displacement between the two members of the resilient coupling.

Another improvement according to my invention relates to starters in which the claw is provided with an axial hole for the passage of a slidable rod terminated by an abutment against which said claw is urged by a resilient means and provided for ensuring the fluid-tightness of said hole so as to prevent any inlet of oil into the case of the starter.

According to one embodiment, said fluid-tightness is ensured by means of a ring made of plastic material of U-shaped cross-section, which is inserted in said hole and the two arms of which are radial and are in contact with the two outer and inner faces of the claw, said resilient means including a spring which bears against said ring and keeps it compressed.

According to another embodiment, a fluid-tight plug is fitted in the centre of the outer face of the claw and is provided with an inner chamber which enables said rod and its abutment to effect their movements when the claw is sliding.

Another of said improvements consists in that, the apparatus being of the type which includes a coupling claw adapted to be actuated by a barrel which is rotated, through an epicyclic reducer train and a torque limiting device operating by friction, by a fly-wheel driven at high speed, said torque limiting device is interposed between the case of the reducer and a normally stationary sun-wheel of said epicyclic train, the slipping in case of overload being thus effected between said wheel and the case.

This arrangement enables the diameter of the discs of the torque limiting device to be considerably increased and consequently the number or the pressure of the springs to be decreased.

A still further improvement consists in the fact that a device for adjusting a torque limiting device interposed in the transmission between the fly-wheel and the coupling claw for the engine is accessible from the outside.

Another improvement is that the electric motor for actuating the fly-wheel is a moderate speed one of the order of eight to ten thousand revolutions per minute and gearing up means are interposed between said motor and said fly-wheel, the whole gearing up means being preferably secured to said motor and being removable as a unit with same. It is thus possible:

(1) To use an electric motor having a higher efficiency than that of very high speed electric motors, (2) To increase the speed of the fly-wheel to be started and thus decrease its weight.

Other improvements will furthermore become apparent from the ensuing description of an exemplary embodiment of an electric starter provided with all the aforesaid improvements and of apparatus for the ignition during starting.

Said exemplary embodiment is shown in longitudinal section in Fig. 1 of the accompanying drawings:

Fig. 2 is a partial section along the line II—II of Fig. 1;

Fig. 3 shows a modification of construction of a detail; and

Figure 5:
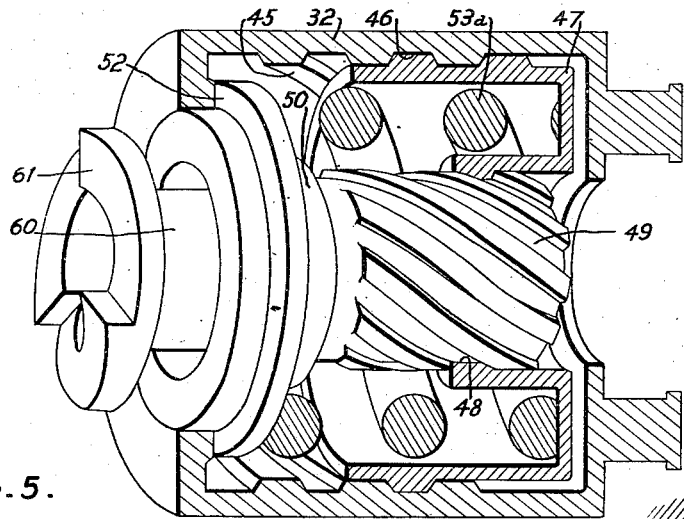

Fig. 4 a modification of another detail;

Fig. 5 reproduces in perspective the front part of Fig. 1, slightly modified

Figures 6, 7:
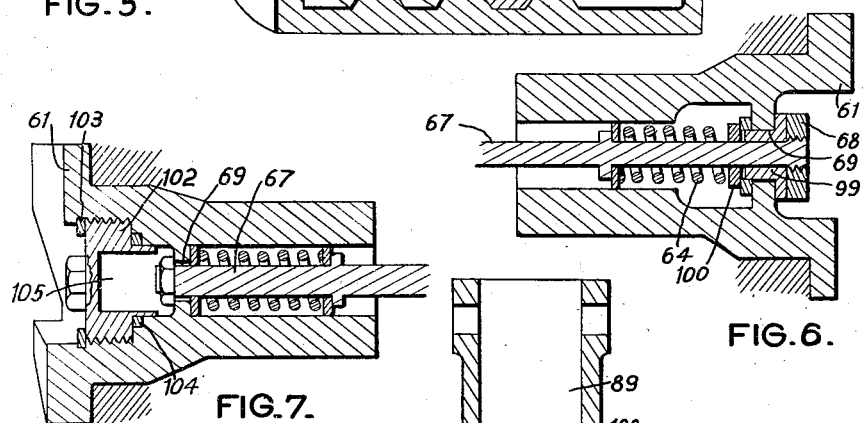

Figs. 6 and 7 are partial views showing modifications of Fig. 1.

Figure 8:
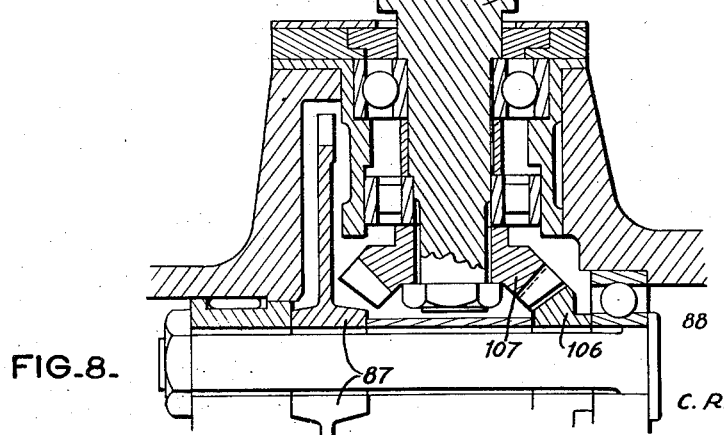

Fig. 8 is a detail.

The starter shown includes, like all fly-wheel starters, a fly-wheel 1. Said fly-wheel 1 is bolted on a plate 2 secured to a hollow elongated hub 3 supported near said plate by a bearing 4 carried by a plate 5 fixed on the end of a cylindrical box 6 carried by a partition 7 inside the case of the apparatus. Said plate 2 carries, on the opposite side to that on which is located the fly-wheel 1, a plurality of shafts 8 which are angularly distributed about the hub 3 and on which are respectively mounted pinions 9 meshing on the one hand with a common pinion 10 secured to the hub 3, and on the other hand with an internally toothed pinion 11, the hub 12 of which is loosely mounted on the hub 3 of the fly-wheel. Beside said hub 12 the hub 3 carries, likewise loosely mounted, the hub 14 of a planet wheel carrier plate 15 on which are mounted a plurality of pinions 17 meshing with a sun-wheel 18 secured to the hub 12 and with a sun-wheel 19 carried by a sleeve 20 centred in the box 6 and provided with an external collar 21 fixed on the end of the box 6 opposite that carrying the plate 5. Said sleeve 20 carries a second sun-wheel 23 with which mesh planet wheels 24 mounted on a planet wheel carrier plate 25, the hub 26 of which is likewise loosely mounted on the hub 3. The planet gears 24 mesh on the other hand with a sun-wheel 28 secured to the hub 14. A pinion 29 is secured to the hub 26 and meshes with a plurality of pinions 30 carried by shafts 31 fixed to the end of a rotary barrel 32 centred by means of ball bearings 33 in a bearing surface 34 of the case. At the centre of the end of said barrel 32 is lodged a ball bearing 35 which acts as a bearing for the end of the hub 3. Said pinions 30 mesh with a sun-wheel 36 which carries on the outside thereof splines on which are fitted the annular discs of a torque limiting device of the usual friction type, the springs 38 of which press all said discs against a plate 39 which is fixed to the case and which centres the wheel 36 by means of a smooth bearing surface provided in the latter. Each of the springs 38 has one of its ends fitted in a cup 40 secured to fingers 41 which pass through the wall of the case and project outside same where all said fingers are in contact with a plate 42 adapted to screw on a screwthread 43 provided on the outside of the cylindrical bearing surface 34.

The inner face of the cylindrical part of the barrel 32 is provided with helical ramps with a reversible pitch 45 engaging with corresponding ramps 46 provided on the cylindrical periphery of movable piece having the form of a cup 47 and provided at its centre with a hole in the wall of which are formed splines 48 which may be formed by helical ramps and engaged with corresponding splines or ramps 49 of a sleeve 50 coaxial with the barrel and centred at its end on a cylindrical bearing surface 51 projecting from the end of the barrel 32. At its other end, the sleeve 50 carries a plate 52, a strong spring coaxial with the barrel or a series of springs 53 in ring formation are arranged inside the barrel 32 between the cup 47 and said plate 52. A retaining ring 54, which a splined fit in the barrel 32 secures to the latter, holds the sleeve 50 axially, being itself retained longitudinally by means of a nut 55 screwed on the end of the barrel 32.

On the inside of the bore of said sleeve 50 are formed splines 58 which fit into longitudinal splines cut on the stem 60 of the coupling claw 61 for the engine to be started, it being thus possible for said claw to slide longitudinally relatively to the sleeve 50. This possible movement is limited by two shoulders 62 and 63 which respectively abut at the end of the splines 58 and at the end of the sleeve 50. Said stem 60 is provided on the opposite side to the claw 61 with an axial recess 64 in which is lodged a spring 65 interposed between the bottom of said recess and a shoulder 66 of a long rod 67 lodged in the axis of the hollow hub 3 and the stem 60, through both of which it passes freely from end to end as well as the bottom of said recess 64. It can also slide longitudinally and a nut 68 is screwed on its end and projects outside in the axis of the claw 61, said nut thus forming an abutment against the body of said claw for limiting the axial movement of the rod under the pressure of the spring 65. The opposite end of the central rod 67 is attached to one of the arms of an equalizing lever 70 which is carried by a fixed spindle 71 inside the case and the other arm of which is engaged by a slidable rod 72 projecting outside the case.

The end of the hub 3 nearest the fly-wheel 1 is secured to a pinion 75 which meshes with a wheel 76 of larger diameter which is loosely mounted on the shaft 77 of a moderate speed electric motor 78, of the order of eight to ten thousand revolutions for example. Sair wheel 76 furthermore has a rim 79 inside which is arranged a plate 80, the hub of which is keyed on the shaft 77. A shaft 81 fixed on the plate 80, near the periphery thereof, passes through a radially ovalized eye 82 at the end of a resilient circular jaw 83. The latter is centred at three points on the plate in such a manner that in the inoperative position there is a clearance between said jaw 83 and the rim 79 which surrounds it, but under the action of centrifugal force the jaw opens resiliently and rubs against said rim 79, thereby ensuring the drive of the wheel 76. The clutch is constructed so as to be self-tightening but not self-locking. It thus has a variable driving capacity, at the same speed, according to whether the one or the other of its parts is the driving part and the other the resisting part. The whole gearing-up arrangement 76—83 is adapted to be able to pass through the orifice of the case in which fits the end of the motor 78 and can thus be removed and placed in position as an integral unit with said motor, the case of which carries a flange 85 for fixing on the edges of said orifice.

On the end of the barrel 32 there is furthermore fixed a gear 86 which is concentric with the barrel and which meshes with a wheel 87 fast on a shaft 88 which is journalled in the case and which projects outside same by means of a head 89 adapted to receive a crank handle or other manually actuable member.

The operation is as follows:

When the electric motor 78 is started, the centrifugal friction clutch 79—83 is not engaged, so that the motor starts unloaded and the current taken is comparatively small; the shaft 77 of the motor drives the plate 80 at increasing speed; the jaw 83 then gradually opens under the action of the increasing centrifugal force and rubs against the rim 79 when the motor is rotating at a predetermined speed, thereby ensuring the drive of the wheel 76 and of the fly-wheel 1 through the gearing-up mechanism 78—75. This rotation of the fly-wheel 1 is transmitted to the barrel 32 by means of the reducing pinions 10, 9 and 11 and of the epicyclic reducing trains 18, 17, 19, 28, 24, 23 and 29, 30, 36, the sun-wheel 36 being held stationary by the friction device 37 to 40. As nothing prevents the rotation of the claw 61 and of the sleeve 50 which is secured thereto, the cup 47 which rotates integral with the sleeve 50 is rotated by the helical ramps 45 without tending to screw into the barrel 32.

When the fly-wheel 1 has received sufficient impetus, the rod 72 is pulled, which is effected in this case by means of an electromagnet 90 which is energized at the selected instant; the rod 66 is then pushed in the direction f and tends to compress the spring 65 which in turn pushes back the claw 61 and brings it into engagement with that of the engine.

As soon as the two claws engage, the claw 61 is brought to a standstill and a relative rotation then exists between the sleeve 50 and the barrel 32, which results in an axial movement of the cup 47 against the action of the springs 53 which it gradually compresses until the torque transmitted by said cup to the claw 61, which torque depends on the tension of said springs, is sufficient to set in rotation the crankshaft of the engine to be started. As soon as the engine starts to rotate under its own power, the starting claw pushes back the claw 61 which returns to the position of Fig. 1, against spring 65, while the springs 53 contract and return the cup 47 to its inoperative position.

In the event of there being an abnormally high but limited resisting torque, slipping of the friction device 37 to 40 occurs and consequently a corresponding rotation of the sun-wheel 36. The value of the maximum torque which said limiting device 39—40 enables to transmit can be readily controlled, without its being necessary to remove the apparatus, by simply manipulating the nut 42 which is outside the apparatus.

On the other hand, the clutch 83—79 is so constructed that, when the resisting torque becomes abnormally high and produces a slowing down of the fly-wheel and of the electric motor 78, its driving torque is less than that of the motor at a speed for which the back electromotive force of the motor is sufficient to limit the intensity of the current of the motor to a value than can be permanently supported by the windings. Slipping then occurs of the jaw 83 relatively to the rim 79 and the automatic release of the clutch thus obtained enables the current to be left on the electric motor 78 without danger of a short-circuit, since said motor can thus continue to rotate at a fair speed while the speed of the fly-wheel continues to decrease.

In the event of failure of the electric motor, the fly-wheel 1 may be started by hand by means of the shaft 88 which enables the barrel 32, and consequently the fly-wheel, to be rotated through the reducing transmission between the fly-wheel and the barrel, which transmission in this case operates with a gear up ratio.

It will be observed that said transmission has a considerable ratio for a very reduced bulk and weight.

Fig. 3 shows a modification of construction of the device for adjusting the torque limiting device 37 to 40. In this modification, the cup 40 for seating the springs 38 is pressed against a screw-threaded part 92 which screws in the case and carries teeth 93 with which engages a pinion 94 carried by a shaft 95 which projects from the case. It is obvious that by rotating said shaft 95, the screw-threaded part 92 is screwed more or less into the case thereby adjusting the springs.

In the modification of Fig. 4, the centrifugal clutch with a self-tightening resilient jaw is replaced by the combination with a free-wheel 96 of a centrifugal clutch, the driving capacity of which is identical in both directions of rotation, said clutch being provided with masses 97 which are movable radially in a cage 98 so as to engage the rim 79 under the action of centrifugal force, said cage 98 being carried by the shaft 77 by means of said free-wheel 96. When the electric motor is started the clutch 79—97 is not engaged and the shaft 77 only drives the cage 98 through the free-wheel 96; it therefore starts with practically no load; when it has been started, the masses 97 rub against the rim 79 and ensure the drive of the wheel 76 and of the whole of the mechanism the latter actuates. The free-wheel 96 enables said wheel 76 to rotate faster than the shaft 77 so that if the supply current of the electric motor is cut off, the latter will not be rotated by the fly-wheel and will not exert braking action thereon.

Fig. 5 reproduces in perspective the front part of Fig. 1, the springs 53 being replaced by a single spring coaxial with the claw 53ª. Fig. 6 shows a means for preventing the oil from the engine or the like from penetrating into the case of the starter through the passage 69 provided in the claw 61 for the rod 67 which is provided with an abutment 68 against which the sleeve is pressed by the spring 64. Said means consists in a ring 99 made of plastic material, the cross-section of which is U-shaped, the two lips of the U respectively bearing against the front and rear transverse faces of the claw 61. Said ring may be made in two parts, as shown, and on it bears the spring 64 by means of a washer 100. Under these conditions, the material of said ring is compressed and presses intimately against the walls of the passage 69 and against the rod 67.

As shown in the modification of Fig. 7, the same result could be obtained simply by means of a screw-threaded plug 102 adapted to close a central recess of the claw 61, fluid-tightness being ensured by means of two rings 103 and 104.

Said plug is provided with an inner chamber 105 of sufficient depth to enable the abutment 68 of the rod 67 to effect its movement.

Finally, Fig. 8 shows a modification of the manual starting device, according to which the shaft 88 is enclosed in the case and is connected by a single pair of gears 106—107 to a shaft 108 which is arranged perpendicular to the axis of the claw and is provided with a very accessible head 89 which is intended to receive a removable crank handle or the like. The manual starting can thus be effected under the best conditions.

While I have illustrated and described the preferred form of construction for carrying my invention into effect, this is capable of variation and modification, without departing from the spirit of the invention, I therefore do not wish to be limited to the precise details of construction set forth, but desire to avail myself of such variations and modifications as come within the scope of the appended claims.

What I claim is:

1. In a fly-wheel starter for air internal combustion engine comprising a fly-wheel, means for imparting a high speed of rotation to said fly-wheel, a claw adapted to be coupled to the engine to be rotated, a transmission between said claw and said fly-wheel and a torque limiting device interposed in said transmission, coupling means between two members of said transmission rotatably connected respectively to said claw and to said fly-wheel and allowing a relative angular displacement of said two members, and a resilient metal device included in said coupling means, said metal device being mounted to be tensioned under the effect of said angular displacement in the direction corresponding to a faster rotation of the one of said members rotatably connected to the fly-wheel with reference to the other, the degree of tension of said resilient device determining the driving torque applied to said coupling claw.

2. In a fly-wheel starter for an internal combustion engine comprising a fly-wheel, means for imparting a high speed of rotation to said fly-wheel, a claw adapted to be coupled to the engine to be started, and a transmission between said claw and said fly-wheel, two coaxial rotary members included in said transmission and rotatably connected respectively to said fly-wheel and to said claw, said rotary members being mounted to rotate one with respect to the other and being relatively stationary in the axial direction, a movable member, means mounting said movable member both for rotation coaxially with said rotary members and for axial movement, connecting slidable keyings between said movable member and said rotary members respectively, at least the connecting keyings between two of said members including reversible fillets and resilient means mounted to urge axially said movable member in the opposite direction to the movement it effects under the action of said fillets when the aforesaid rotary member connected to the claw rotates slower than the other rotary member.

3. A fly-wheel starter for an internal combustion engine as claimed in claim 2 including further a torque limiting device in said transmission.

4. In a fly-wheel starter for internal combustion engine comprising a fly-wheel, means for imparting a high speed of rotation to said fly-wheel, a claw rotatable about an axis and adapted to be coupled to the engine to be started, a high ratio reducing gear driven by said fly-wheel and a transmission between said reducing gear and said claw, said transmission including a barrel coaxial with said axis and rotatably connected with said gear, a driven sleeve coaxial with said barrel, the facing surfaces of said barrel and of said sleeve being provided with splines, the splines provided on at least one of said surfaces being formed by reversible fillets, a movable member between said barrel and said sleeve, the outer and inner surfaces of which are provided with splines engaging the aforesaid splines respectively, resilient means mounted to urge axially said movable member in the opposite direction to the movement it effects under the action of said splines when the sleeve rotates slower than the barrel.

5. A fly-wheel starter as claimed in claim 4 including further an independently adjustable torque limiting device included in said transmission.

6. A fly-wheel starter as claimed in claim 2 in which the means mounting said movable members are formed by helical fillets.

7. In a fly-wheel starter for internal combustion engine comprising a fly-wheel, means for imparting a high speed of rotation to said fly-wheel, a claw rotatable about an axis and adapted to be coupled to the engine to be started, a high speed ratio reducing gear driven by said fly-wheel and a transmission between said reducing gear and said claw, said transmission including a barrel coaxial with said axis and rotatably connected to said gear, a driven sleeve arranged within said barrel and coaxial therewith, the inner surface of said barrel and the outer surface of said sleeve being provided with splines, an axially movable member between said sleeve and said barrel, the said movable member being provided with splines engaging the aforesaid splines resilient means within said barrel and mounted to urge axially said movable member in the opposite direction to the movement it effects under the action of said splines when the sleeve rotates slower than the barrel, and means for slidably keying the claw within the said sleeve.

8. A fly-wheel starter as claimed in claim 7 in which said resilient means include one helical spring, coaxial with said sleeve and said barrel and arranged between said sleeve and said barrel.

9. A fly-wheel starter as claimed in claim 7 in which said resilient means include coil springs arranged in ring formation inside said barrel.

10. In a fly-wheel starter comprising a case, a fly-wheel, a rotatable claw adapted to be coupled to the engine to be started, a transmission between said claw and said fly-wheel and a friction torque limiting device in said transmission, discs coaxial with the said claw forming part of said torque limiting device, an axially movable ring in front of said discs and provided with fingers projecting outwardly through holes formed in the said case, coil springs arranged in annular formation between said discs and said ring, an external plate threadedly engaging the outside surface of said case and bearing against said fingers whereby the tension of said springs is adjustable from the outside of the case.

11. In a fly-wheel starter comprising a case, a fly-wheel, a rotatable claw adapted to be coupled to the engine to be started, a transmission between said claw and said fly-wheel, a torque limiting device in said transmission, discs coaxial with the said claw forming part of said torque limiting device, an axially movable member spaced from said discs, said movable member being provided with gear receiving elements, coil springs intermediate said discs and said movable member, and means accessible from without the said case engaging said gear receiving elements whereby the distance between said movable member and said discs may be readily adjusted.

CHARLES RAYMOND WASEIGE.